US 6,739,501 B2

(12) United States Patent
Murakami et al.

(10) Patent No.: US 6,739,501 B2
(45) Date of Patent: May 25, 2004

(54) CASH DRAWER CONTROLLING APPARATUS AND A METHOD OF CONTROLLING CASH DRAWERS

(75) Inventors: Kazuya Murakami, Kawasaki (JP);
Masafumi Furui, Yokohama (JP);
Hidenori Endo, Yokohama (JP);
Yoshihiro Nakamura, Zama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 57 days.

(21) Appl. No.: 09/954,002

(22) Filed: Sep. 18, 2001

(65) Prior Publication Data

US 2002/0033413 A1 Mar. 21, 2002

(30) Foreign Application Priority Data

Sep. 19, 2000 (JP) ........................................ 2000-283938

(51) Int. Cl.[7] ................................................. G07G 1/00
(52) U.S. Cl. ............................ 235/22; 235/7 R; 235/10; 705/16
(58) Field of Search ............................ 235/7 R, 10, 22; 705/16, 18, 21, 24, 25

(56) References Cited

U.S. PATENT DOCUMENTS

| 4,264,954 | A | * | 4/1981 | Briggs et al. ................... 710/4 |
| 4,556,882 | A | * | 12/1985 | Brifman et al. ............. 340/3.44 |
| 4,595,985 | A | * | 6/1986 | Sakakiya ..................... 705/18 |
| 4,751,581 | A | * | 6/1988 | Ishiguro et al. .............. 348/734 |
| 4,855,908 | A | * | 8/1989 | Shimoda et al. ............... 705/20 |
| 4,893,201 | A | * | 1/1990 | Emori et al. .............. 360/77.04 |
| 4,937,744 | A | * | 6/1990 | Ball ............................ 705/18 |
| 5,111,394 | A | * | 5/1992 | Hilles et al. ................... 705/16 |
| 5,263,662 | A | * | 11/1993 | Fowler et al. ............ 244/17.13 |
| 6,390,361 | B1 | * | 5/2002 | Gund .......................... 235/7 R |

FOREIGN PATENT DOCUMENTS

| JP | 08016921 A | * | 1/1996 | ............. G07G/1/12 |
| JP | 20000331242 A | * | 11/2000 | ............. G07G/1/00 |

* cited by examiner

Primary Examiner—Diane I. Lee
Assistant Examiner—Kumiko C. Koyama
(74) Attorney, Agent, or Firm—Louis Woo

(57) ABSTRACT

A cash drawer device includes a command receiving and outputting circuit for receiving a plurality of open commands and outputs the open commands, and a simultaneous open inhibiting circuit for inhibiting the command receiving and outputting circuit from simultaneously outputting more than one of the open commands when more than one of the open commands are simultaneously received by the command receiving and outputting circuit. A first simultaneous open inhibiting circuits includes an exclusive OR gate. A second simultaneous open inhibiting circuit includes first and second D flip-flops. The cash drawer device may further include a concurrent open inhibiting circuit having a timer responsive to one of the open commands for inhibiting the command receiving and outputting circuit from outputting another of the open commands for a predetermined interval. Thus, power consumption of driving a plurality of drawers can be suppressed. The invention also includes a method of controlling cash drawers.

3 Claims, 4 Drawing Sheets

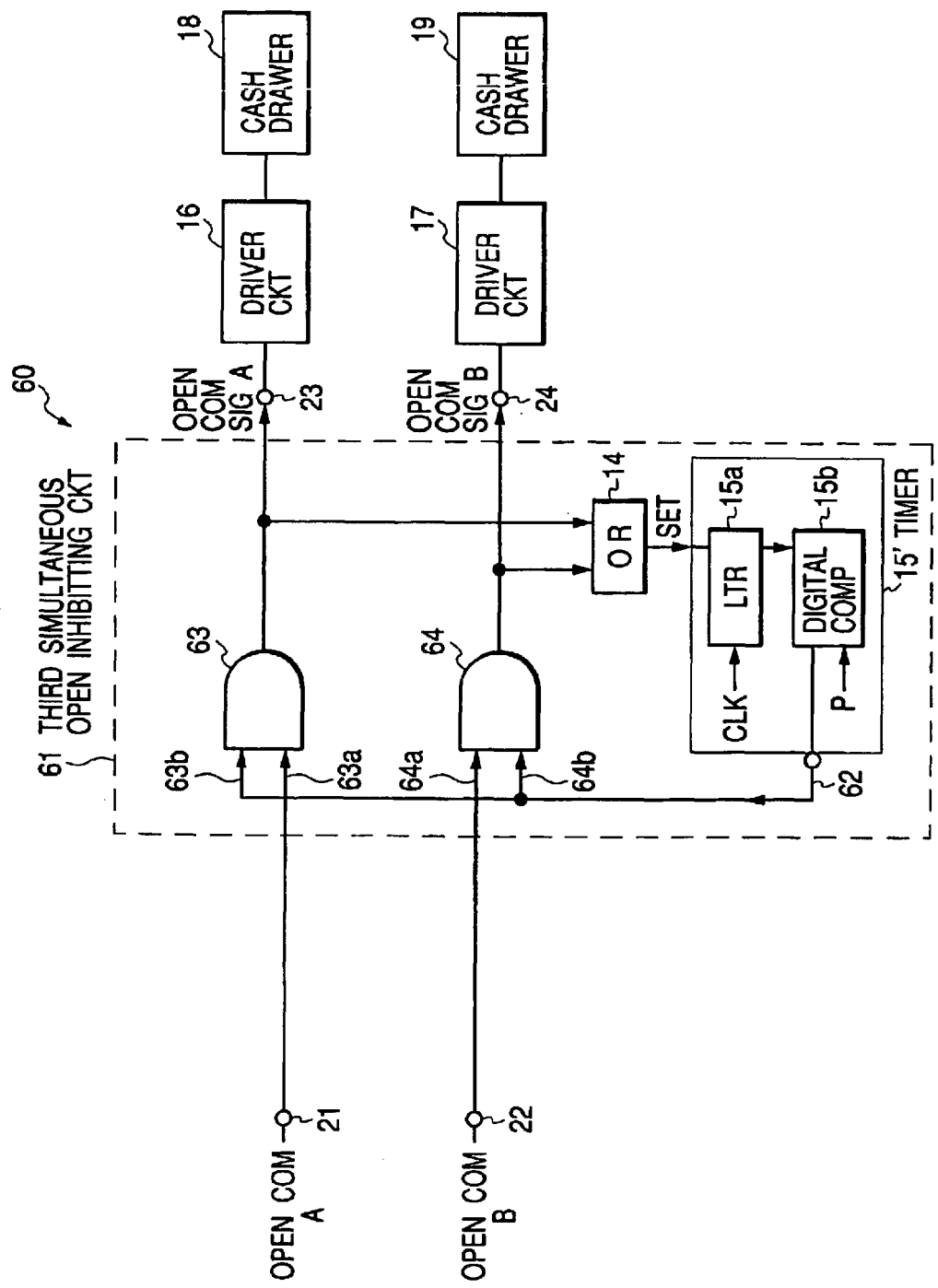

CASH DRAWER CONTROLLING APPARATUS AND A METHOD OF CONTROLLING CASH DRAWERS

BACKGROUND OF THE INVENTION

1. Field of the Invention

This invention relates to a cash drawer controlling apparatus for controlling open of a plurality of cash drawers and a method of controlling open of a plurality of cash drawers.

2. Description of the Prior Art

Cash drawer controlling apparatuses for controlling drivers for opening a plurality of drawers in response to a plurality of open commands (requests), are known. The open commands are supplied from a personal computer for example, and application software in the personal computer may output a plurality of open commands at the same time. In this case, the prior art cash drawer controlling apparatus outputs more than one of open commands at the same time. Its driver circuits open a plurality of cash drawers at the same time, so that power consumption in the drivers increases.

SUMMARY OF THE INVENTION

The aim of the present invention is to provide a superior cash drawer controlling apparatus and a method of controlling cash drawers.

According to the present invention, a first aspect of the present invention provides a cash drawer controlling apparatus comprising: command receiving and outputting means having input terminals and output terminals for receiving a plurality of open commands and outputting said open commands; and simultaneous open inhibiting means for inhibiting said command receiving and outputting means from simultaneously outputting more than one of said open commands when more than one of said open commands are simultaneously received by said command receiving and outputting means.

According to the present invention, a second aspect of the present invention provides a cash drawer controlling apparatus based on the first aspect, wherein said simultaneous open inhibiting means comprises an exclusive OR gate.

According to the present invention, a third aspect of the present invention provides a cash drawer controlling apparatus based on the first aspect, wherein said simultaneous open inhibiting means comprises first and second D flip flops, an inverted Q output of said first D flip flop is supplied to a D input of said second D flip flop, and an inverted Q output of said second D flip flop is supplied to a D input of said first D flip flop.

According to the present invention, a fourth aspect of the present invention provides a cash drawer controlling apparatus based on the first aspect, further comprises concurrent open inhibiting means in response to one of said open commands for inhibiting said command receiving and outputting means from outputting another one of said open commands for a predetermined interval.

According to the present invention, a fifth aspect of the present invention provides a cash drawer controlling apparatus based on the fourth aspect, wherein said concurrent open inhibiting means comprises a timer for measuring said predetermined interval in response to said one of said open commands.

According to the present invention, a sixth aspect of the present invention provides a cash drawer controlling apparatus based on the fifth aspect, wherein said concurrent open inhibiting means comprises said first and second D flip flops, an OR gate of which inputs supplied with Q outputs of said first and second D flip flops, respectively, and a timer responsive to an output of said OR gate for measuring said predetermined interval, an inverted Q output of said first D flip flop is supplied to a D input of said second D flip flop, an inverted Q output of said second D flip flop is supplied to a D input of said first D flip flop, an output of said timer is supplied to clear inputs of said first and second D flip flops.

According to the present invention, a seventh aspect of the present invention provides a cash drawer controlling apparatus comprising: command receiving and outputting means having input terminals and output terminals for receiving a plurality of open commands and outputs said open commands; and concurrent open inhibiting means in response to one of said open commands for inhibiting said command receiving and outputting means from outputting another one of said open commands for a predetermined interval.

According to the present invention, an eighth aspect of the present invention provides a cash drawer controlling apparatus based on the seventh aspect, wherein said concurrent open inhibiting means comprises a timer for measuring said predetermined interval in response to said one of said open commands.

According to the present invention, a ninth aspect of the present invention provides a cash drawer controlling apparatus based on the seventh aspect, wherein said concurrent open inhibiting means comprises said first and second D flip flops, an OR gate of which inputs supplied with Q outputs of said first and second D flip flops, respectively, and a timer responsive to an output of said OR gate for measuring said predetermined interval, an inverted Q output of said first D flip flop is supplied to a D input of said second D flip flop, an inverted Q output of said second D flip flop is supplied to a D input of said first D flip flop, an output of said timer is supplied to clear inputs of said first and second D flip flops.

According to the present invention, a tenth aspect of the present invention provides a method of controlling cash drawers comprising the steps of: (a) receiving a plurality of open commands; (b) in response to one of said open commands, judging whether more than one of open commands are simultaneously received; (c) outputting said one of said open commands when more than one of open commands are not received simultaneously: and (d) neglecting said one of said open commands when more than one of open commands are simultaneously received.

According to the present invention, an eleventh aspect of the present invention provides a method based on the tenth aspect further comprises the steps of: measuring a predetermined interval in response to said step (b); and neglecting any of said open commands for said predetermined interval.

According to the present invention, a twelfth aspect of the present invention provides a cash drawer controlling apparatus comprising: command receiving and outputting means having input terminals and output terminals for receiving a plurality of open commands and outputting said open commands; and simultaneous open inhibiting means for inhibiting said command receiving and outputting means from simultaneously outputting said open commands for a predetermined interval in response to one of said open commands.

According to the present invention, a thirteenth aspect of the present invention provides a cash drawer controlling apparatus based on the eleventh aspect, wherein said simultaneous open inhibiting means comprises: first and second AND gates of which first inputs are supplied with said open commands, respectively; an OR gate of which inputs supplied with outputs of said first and second AND gates, respectively; and a timer responsive to an output of said OR gate for measuring said predetermined interval to supply a pulse having time duration of a predetermined interval to second inputs of said first and second AND gates, respectively.

BRIEF DESCRIPTION OF THE DRAWINGS

The object and features of the present invention will become more readily apparent from the following detailed description taken in conjunction with the accompanying drawings in which:

FIG. 5 is a block diagram of a cash drawer controlling apparatus according to a third embodiment of the present invention.

The same or corresponding elements or parts are designated with like references throughout the drawings.

DETAILED DESCRIPTION OF THE INVENTION

Figure 1:
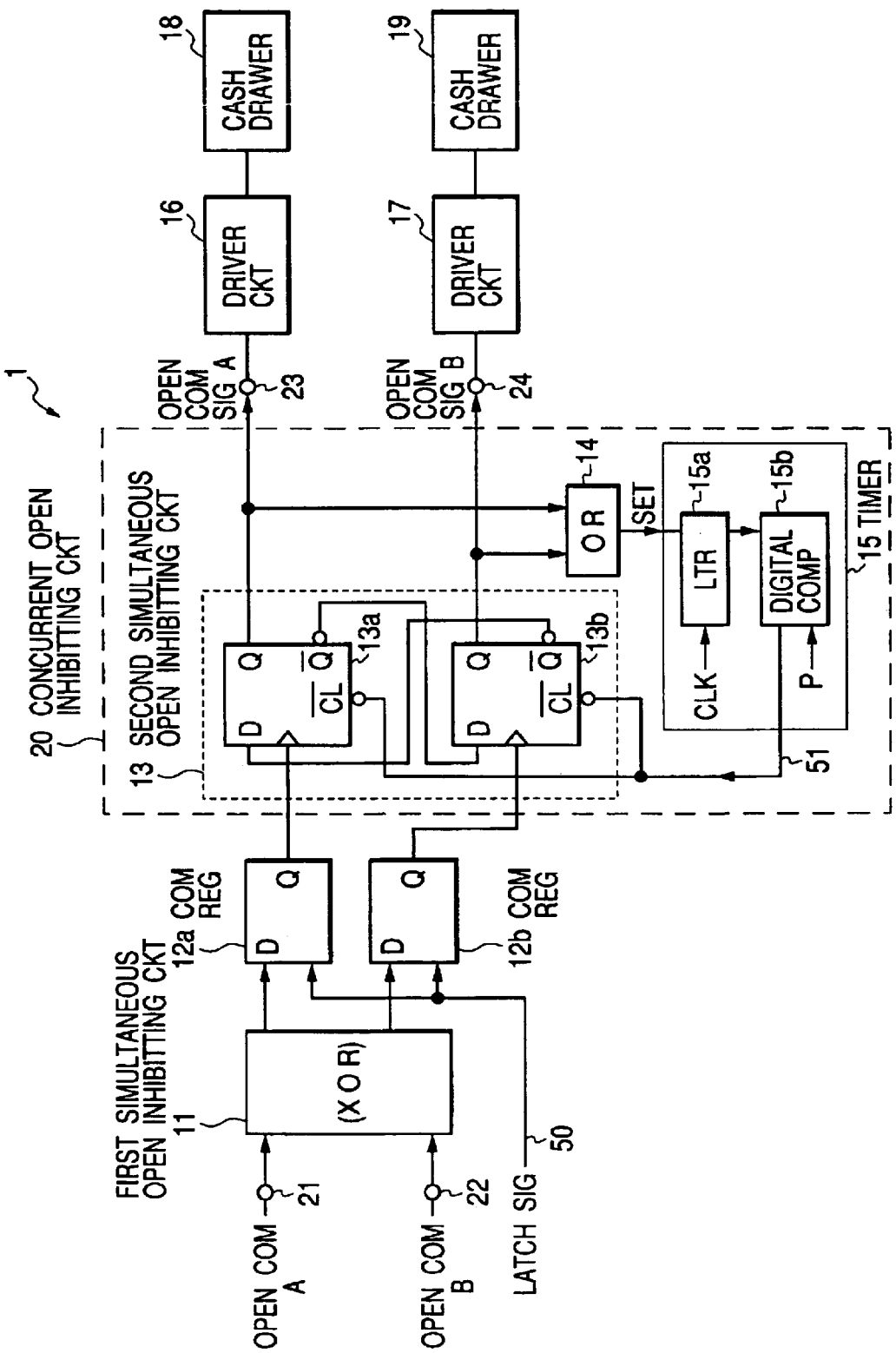
FIG. 1 is a block diagram of a cash drawer controlling apparatus according to a first embodiment of the present invention.
Figure 2:
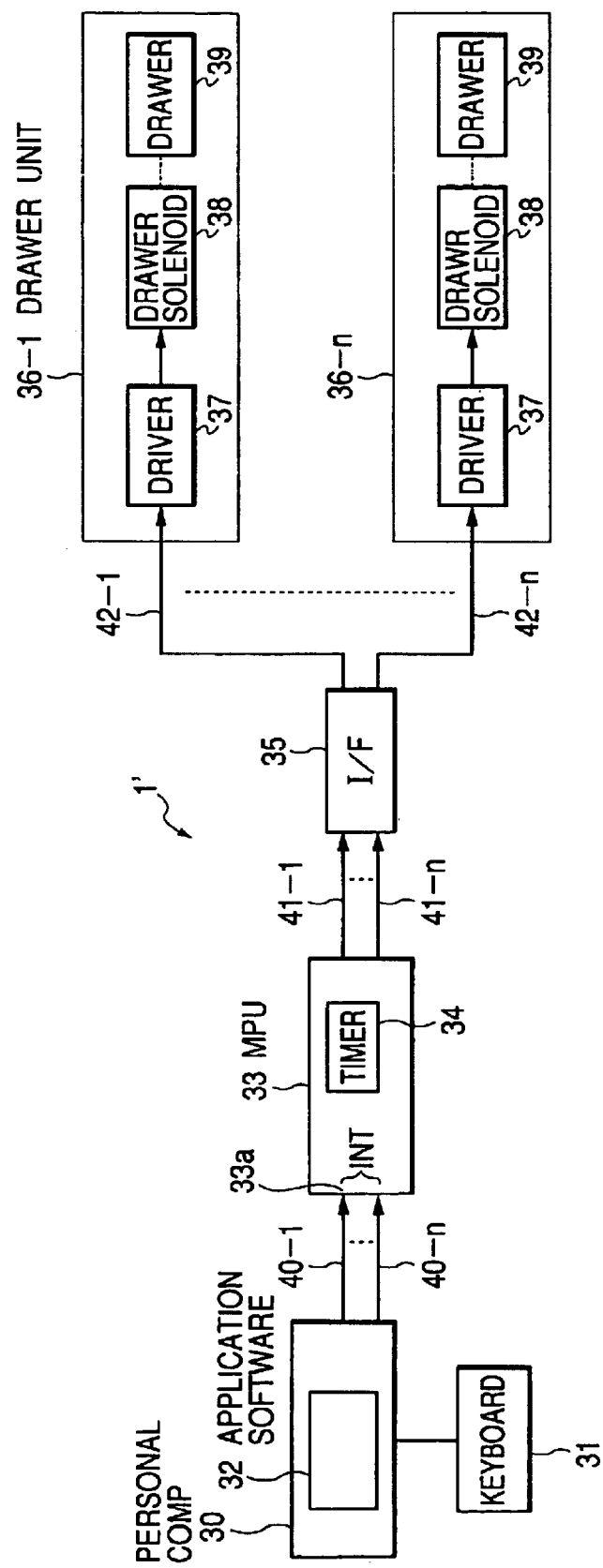
FIG. 2 is a block diagram of a cash drawer controlling apparatus according to a second embodiment of the present invention.

FIG. 1 is a block diagram of a cash drawer controlling apparatus according to a first embodiment of the present invention. FIG. 2 is a block diagram of a cash drawer controlling apparatus according to a second embodiment of the present invention. In FIG. 2, the cash drawer controlling apparatus 1' (1) is supplied with a plurality of open commands (requests) from a personal computer 30 in which application software 32 for operating a cash drawer system in response to a keyboard 31 accompanying the personal computer 30. The cash drawer controlling apparatus 1' (1) receives the open commands 40-1 to 40-n and supplies one of open command signals 42-1 to 42-n to one of drawer units 36-1 to 36-n through an interface 35. In FIG. 1, the personal computer 30 and the keyboard 31 are not shown.

First Embodiment

Referring now to FIG. 1, the cash drawer controlling apparatus includes a first simultaneous open inhibiting circuit 11 and a concurrent open inhibiting circuit 20. Moreover, command registers 12a and 12b are provided between the first simultaneous open inhibiting circuit 11 and the concurrent open inhibiting circuit 20.

The first simultaneous open inhibiting circuit 11 includes an exclusive OR gate of which first input is supplied with an open command A through an input terminal 21, and second input is supplied with an open command B through an input terminal 22.

If either of the open command A or the open command B (value of 1) is supplied to the first simultaneous open inhibiting circuit 11, the first simultaneous open inhibiting circuit 11 outputs the received command (1) to the corresponding command register 12a and 12b. If both of the open commands A and B are supplied at the same time, the first simultaneous open inhibiting circuit 11 neglects the open commands, that is, the first simultaneous open inhibiting circuit 11 outputs values of "0".

The command registers 12a and 12b latch the outputs of the first simultaneous open inhibiting circuit 11 in response to a latch signal 50, respectively. The latch signal 50 is generated in response to the open commands A and B. That is, the outputs of the first simultaneous open inhibiting circuit 11 are latched with a predetermined delay from reception of either of open commands A or B to obtain the stable levels. Therefore, the command registers 12 may be omitted. The latch signal 50 may be generated by the personal computer 30 or the open command controlling apparatus. However, this structure is not shown because the command registers 12 may be omitted. The command registers 12a and 12b include D flip-flops as shown in FIG. 1.

Outputs of the command registers 12a and 12b are supplied to D flip-flops 13a and 13b, respectively.

More specifically, the output of the command register 12a is supplied to a clock input of the D flip-flop 13a. An inverted Q output of the D flip-flop 13a is supplied to a D input of the D flip-flop 13b. An inverted Q output of the D flip-flop 13b is supplied to a D input of the D flip-flop 13a. A Q output of the D flip-flop 13a is supplied to a driver circuit 16 through an output terminal 23 of the cash drawer controlling apparatus, and a Q output of the D flip-flop 13b is supplied to a driver circuit 17 through an output terminal 24 of the cash drawer controlling apparatus.

The Q outputs of the D flip-flops 13a and 13b are supplied to an OR gate 14 also. An output of the OR gate 14 is supplied to a timer 15 for measuring a predetermined interval in response to the output of the OR gate 14 and for outputting a time expiration signal 51 which is supplied to clear inputs of the D flip-flops 13a and 13b.

At first, it is assumed that either of the D flip-flop 13a or 13b is supplied with the open command. For example, it is assumed that open command A is supplied to the D flip-flop 13a. Before supplying the open command A, the D flip-flops 13a and 13b are cleared by the time expiration signal 51 in response to the timer 15 or a power on reset circuit, not shown. Thus, the Q outputs of the D flip-flops 13a and 13b are "0". On the other hand, the D inputs of the D flip-flops 13a and 13b are supplied with "1". In this condition, when the open command A is supplied to the D flip-flop 13a, the Q output of the D flip-flip 13a outputs "1", and its inverted Q output supplies "0" to D input of the D flip-flop 13b. At the same time, if the open command B is supplied from the command register 12b to the D flip-flop 13b, the D flip-flop 13b outputs "0" at its Q output, that is, the D flip-flop 13b neglects the open command B because its D input is supplied with "0". Accordingly the D flip-flops 13a and 13b provide a second simultaneous open inhibiting circuit 13 for inhibiting outputting more than one open command signals.

In this embodiment, the open commands A and B are supplied to the second simultaneous open inhibiting circuit 13 through the first simultaneous open inhibiting circuit 11. However, it is also possible to directly supply the open commands A and B to the second simultaneous open inhibiting circuit 13. That is, the first simultaneous open inhibiting circuit 11 and 12a and 12b can be omitted.

The open command signal A from the D flip-flop 13a is supplied to the driver circuit 16. The driver circuit 16 drives a drawer solenoid in the cash drawer 18 for a predetermined interval.

The open command signal A is also supplied to the OR gate 14. This starts the timer 15. In response to this, the timer 15 outputs the time expiration signal 51 after the predetermined interval has passed. The time expiration signal 51 clears the D flip-flops 13a and 13b after the predetermined interval expires. This initializes the D flip-flops 13a and 13b. Then, the D flip-flops 13a and 13b allow to receive the open command A or B.

Accordingly, if the open command A is supplied to the input terminal 21, and the other open command B is not supplied at that instance, the open command A is outputted as the open command signal A. If the open command B is supplied to the input terminal 22 and the other open command A is not supplied at that instance, the open command B is outputted as the open command signal B. If both open command A and B are supplied at the same time, one of open commands A and B is neglected.

As mentioned above, the cash drawer controlling apparatus includes input terminals 21 and 22 and output terminals 23 and 24 as a command receiving and outputting means for receiving a plurality of open commands A and B and for outputting the open commands. The cash drawer controlling apparatus further includes the first simultaneous open inhibiting circuit 11 for inhibiting the command receiving and outputting circuit 11 from simultaneously outputting more than one of the open commands when more than one of the open commands A and B are simultaneously received by the command receiving and outputting means.

The cash drawer controlling apparatus further includes a second simultaneous open inhibiting circuit 13 having first and second D flip flops 13a and 13b. The inverted Q output of the first D flip flop 13a is supplied to a D input of the second D flip flop 13b. The inverted Q output of the second D flip flop 13b is supplied to a D input of the first D flip flop to inhibit simultaneously outputting more than one of the open commands when more than one of the open commands A and B are simultaneously received.

The cash drawer controlling apparatus further includes a concurrent open inhibiting circuit 20 in response to one of the open commands A and B for inhibiting outputting another one of the open commands for a predetermined interval.

Second Embodiment

FIG. 2 shows the cash register drawer controlling apparatus according to the second embodiment.

The cash register drawer controlling apparatus according to the second embodiment includes a microprocessor 33 including event interruption inputs 33a and a timer 34 and an interface 35. A plurality of open commands 40-1 to 40-n are supplied to event interruption input 33a of the microprocessor 33. The microprocessor 33 executes programs for controlling cash drawers 39 and outputs one of open command signals 42-1 to 42-n through the interface 35.

In FIG. 2, the cash drawer controlling apparatus 1' is supplied with a plurality of open commands (requests) from a personal computer 30 in which application software 32 for operating a cash drawer system in response to a keyboard 31 accompanying the personal computer 30. The cash drawer controlling apparatus 1' receives the open commands 40-1 to 40-n and supplies one of open command signals 42-1 to 42-n to one of drawer units 36-1 to 36-n through an interface 35.

Figure 3:
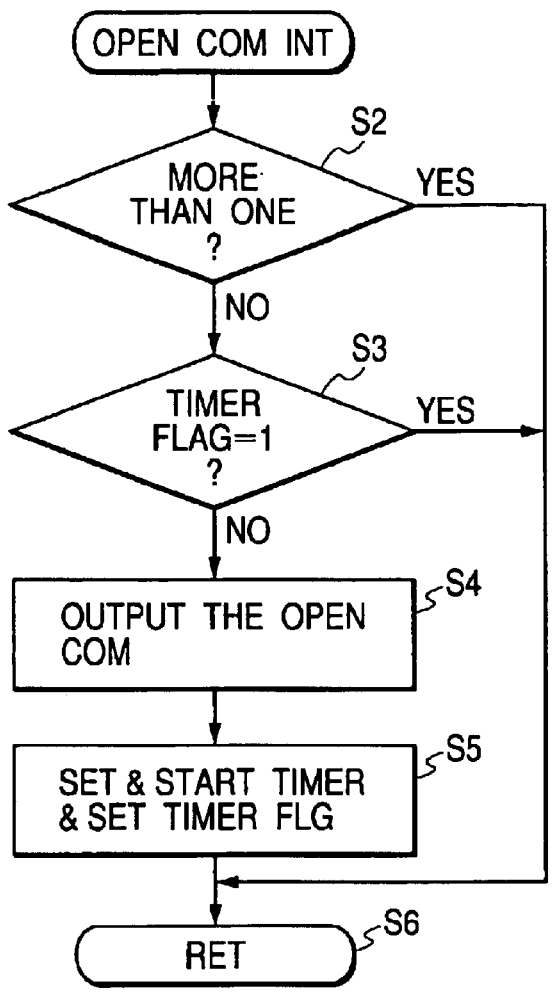
FIG. 3 depicts a flow chart illustrating operation of the microprocessor shown in FIG. 2.

Referring now to FIG. 3, operation of the microprocessor 33 will be described.

In response to either of open commands 40-1 to 40-n, the microprocessor 33 executes the open command interruption shown in FIG. 3. In step s2, the microprocessor 33 judges whether more than one open commands are supplied to the microprocessor 33. If more than one of open commands are supplied to the microprocessor 33 processing returns to the main routine, not shown. If only one open command is supplied, the microprocessor 33 judges whether a timer flag indicative of the time interval energizing the drawer solenoid 38 is set in step s3. If the timer flag is set, that is, the value is "1", processing returns to the main routine because one of the drawer solenoid 38 is energized.

If the timer flag is reset in step s4 (NO), the microprocessor 33 outputs the open command signal to the corresponding driver 37 which generates a driving signal for the predetermined interval to energize the drawer solenoid 38.

If the following step s5, the microprocessor 33 starts the timer 34 therein and sets the timer flag, and processing returns to the main routine.

Figure 4:
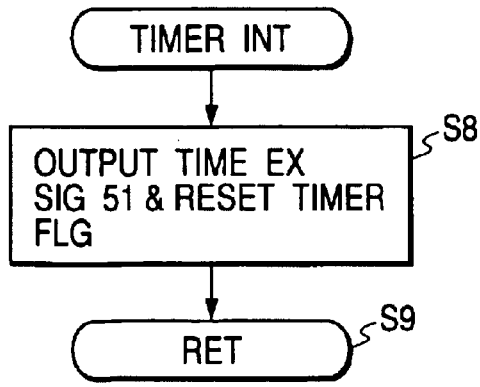
FIG. 4 depicts a flow chart illustrating a timer interruption operation of the microprocessor shown in FIG. 2.

FIG. 4 depicts a flow chart of timer interruption. The timer 34 causes the timer interruption when the predetermined interval has been expired. In response to this, the microprocessor 33 outputs the timer expiration signal 51, resets the timer flag in step s8, and processing returns to the main routine.

As mentioned above, the microprocessor 33 receives a plurality of open commands. In response to one of the open commands, the microprocessor 33 judges whether more than one of open commands are simultaneously received in step s2 and outputs one of the open commands when more than one of open commands are not received simultaneously in step s4. The microprocessor 33 neglects one (all) of the open commands when more than one of open commands are simultaneously received.

The timer 34 measures the predetermined interval in response to step s5. The microprocessor 33 further neglects any of the open commands for the predetermined interval.

Accordingly, if it is assumed that only the open command 40-1 is inputted to the microprocessor 33, the microprocessor 33 supplied the open command signal 42-1 with the interface 34 to the corresponding drawer unit 36-1. In response to this, the driver 37 generates the drive signal for the predetermined interval. The driver solenoid 38 is energized for the predetermined interval to open the drawer 39. At the same time, the microprocessor 33 inhibits outputting any other open command for the predetermined interval. After the predetermined interval has passed, the microprocessor 33 enters a standby condition for receiving the next open command signal.

Accordingly, the power consumption in the drawer units 36-1 to 36-n can be suppressed any time because more than one of the drawer solenoids 38 are not energized at the same time. Moreover, this operation reduces the load of the application software in the personal computer 30.

Third Embodiment

FIG. 5 is a block diagram of a cash drawer controlling apparatus according to the third embodiment. The cash drawer controlling apparatus 60 according to the third embodiment includes a command receiving and outputting circuit having input terminals 21 and 22 and output terminals 23 and 24 for receiving a plurality of open commands and outputting the open commands. The cash drawer control apparatus 60 further includes a third simultaneous open inhibiting circuit 61 for inhibiting the command receiving and outputting circuit from simultaneously outputting the open commands for a predetermined interval in response to one of the open commands.

The third simultaneous open inhibiting circuit 61 includes first and second AND gates 63 and 64 of which first inputs 63a and 64a are supplied with the open commands A and B, respectively, an OR gate 14 of which inputs supplied with outputs of the first and second AND gates 63 and 64, respectively, and a timer 15' responsive to an output of the OR gate 14 for measuring the predetermined interval to supply a pulse having time duration of a predetermined interval to second inputs 63b and 64b of the first and second AND gates 63 and 64, respectively.

In operation, when one of the open commands A and B is supplied to the third simultaneous open inhibiting circuit 61 through the input terminals 21 and 22, the timer 15' outputs the pulse 62 having time duration of a predetermined interval to second inputs 63b and 64b of the first and second AND gates 63 and 64, respectively, so that the AND gates 63 and 64 inhibits no open command for the predetermined interval. Therefore, no open command is outputted for the predetermined interval.

In the fist embodiment, the timer 15 may output the pulse 62 having the time duration of the predetermined interval instead the time expiration signal 51.

What is claimed is:

1. A cash drawer controlling apparatus comprising:

command receiving and outputting means having input terminals and output terminals for receiving a plurality of open commands and outputting said open commands; and simultaneous open inhibiting means for inhibiting said command receiving and outputting means from simultaneously outputting more than one of said open commands when more than one of said open commands are simultaneously received by said command receiving and outputting means;

wherein said simultaneous open inhibiting means comprises first and second D flip flops, an inverted Q output of said first D flip flop is supplied to a D input of said second D flip flop, and an inverted Q output of said second D flip flop is supplied to a D input of said first D flip flop.

2. A cash drawer controlling apparatus, comprising:

command receiving and outputting means having input terminals and output terminals for receiving a plurality of open commands and outputting said open commands; and simultaneous open inhibiting means for inhibiting said command receiving and outputting means from simultaneously outputting more than one of said open commands when more than one of said open commands are simultaneously received by said command receiving and outputting means:

wherein said concurrent open inhibiting means comprises said first and second D flip flops, an OR gate of which inputs supplied with Q outputs of said first and second D flip flops, respectively, and a timer responsive to an output of said OR gate for measuring said predetermined interval, an inverted Q output of said first D flip flop is supplied to a D input of said second D flip flop, an inverted Q output of said second D flip flop is supplied to a D input of said first D flip flop, an output of said timer is supplied to clear inputs of said first and second D flip flops.

3. A cash drawer controlling apparatus, comprising:

command receiving and outputting means having input terminals and output terminals for receiving a plurality of open commands and outputs said open commands; and concurrent open inhibiting means in response to one of said open commands for inhibiting said command receiving and outputting means from outputting another one of said open commands for a predetermined interval;

wherein said concurrent open inhibiting means comprises said first and second D flip flops, an OR gate of which inputs supplied with Q outputs of said first and second D flip flops, respectively, and a tuner responsive to an output of said OR gate for measuring said predetermined interval, an inverted Q output of said first D flip flop is supplied to a D input of said second D flip flop, an inverted Q output of said second D flip flop is supplied to a D input of said first D flip flop, an output of said timer is supplied to clear inputs of said first and second D flip flops.

* * * * *